United States Patent [19]

Miller

[11] Patent Number: 5,247,422
[45] Date of Patent: Sep. 21, 1993

[54] SWITCH ACTUATING ASSEMBLY IN A CIRCUIT BREAKER PANELBOARD

[75] Inventor: Michael W. Miller, St. Louis, Mo.

[73] Assignee: Hubbell Incorporated, Orange, Conn.

[21] Appl. No.: 857,047

[22] Filed: Mar. 24, 1992

[51] Int. Cl.[5] .............................................. H02B 1/04
[52] U.S. Cl. ................................................... 361/632
[58] Field of Search ...................... 200/18, 50 A, 50 C, 200/329-331; 361/346, 350, 351, 356, 357, 358, 360, 363

[56] References Cited

U.S. PATENT DOCUMENTS

| 1,744,209 | 1/1930 | Burnett | 361/348 |
|---|---|---|---|
| 1,901,640 | 3/1933 | Fuller | 361/351 |
| 4,744,003 | 5/1988 | Koslosky et al. | 361/363 |
| 4,783,718 | 11/1988 | Raabe et al. | 361/363 |

Primary Examiner—J. R. Scott
Attorney, Agent, or Firm—Jerry M. Presson; Michael R. Swartz

[57] ABSTRACT

A circuit breaker panelboard has a rear housing that mounts a plurality of circuit breaker modules arranged in a pair of spaced columns. Each module has an actuator associated with it and the plurality of actuators are also arranged in a pair of spaced columns. A front cover is releasably attachable to the rear housing for enclosing the circuit breaker modules and associated actuators. And an improved circuit breaker actuating assembly is coupled to the circuit breaker actuators and to the front cover for facilitating manipulation of the actuators from the exterior of the front cover. The actuating assembly includes operating members and linking members. The operating members of the first group are disposed in a first pair of columns aligned with the pair of columns of circuit breaker actuators and are provided in directly coupled relationships with first alternating ones of the circuit breaker actuators in the columns. The operating members of the second group are disposed in a second pair of columns respectively displaced laterally outwardly from opposite sides of the pair of columns of circuit breaker actuators and are provided in indirectly coupled relationships with second alternating ones of the circuit breaker actuators in the columns. The linking members are formed into first and second groups which extend between and interconnect the second alternating ones of the circuit breaker actuators in the columns and respective ones of the operating members of the second group disposed in the second pair of columns so as to provide the indirectly coupled relationships therebetween.

19 Claims, 8 Drawing Sheets

SWITCH ACTUATING ASSEMBLY IN A CIRCUIT BREAKER PANELBOARD

BACKGROUND OF THE INVENTION

1. Field of the Invention

The present invention generally relates to circuit breaker panelboard installations and, more particularly, is concerned with an improved circuit breaker switch actuating assembly in a circuit breaker panelboard.

2. Description or the Prior Art

Circuit breaker installations wired to major lighting, heating and electrical equipment in industrial facilities are typically enclosed by panelboards to provide protection of and restrict unauthorized access to the circuit breaker switches. In a typical panelboard installation, the switches are parts of modules arranged in a pair of parallel vertical columns. The "on" and "off" positions of the switches in one column of modules are opposite to the "on" and "off" positions of the switches in the other column of modules.

One prior art circuit breaker panelboard for enclosing the columns of circuit breaker modules includes a rear housing defining a cavity, and a front cover hingedly mounted to the rear housing for opening and closing relative thereto. The rear housing supports the circuit breaker modules in the pair of parallel columns in the cavity. Thus, the circuit breaker switches are thereby also arranged in the pair of parallel columns. The front cover has a plurality of closely-spaced holes arranged in a pair of vertical columns. The holes in the vertical columns are disposed in general alignment with the switches of the circuit breaker modules in the pair of vertical columns.

Also, the panelboard includes a plurality of operating members rotatably mounted through the plurality of closely-spaced holes of the front cover. Therefore, the operating members are arranged in a pair of vertical columns corresponding to the pair of vertical columns of the holes. One operating member is provided for each circuit breaker switch. Each operating member basically includes an elongated shaft rotatably mounted through a respective one of the holes in the front cover, a lever or handle attached to an outer end of the shaft and thereby disposed on the exterior side of the front cover where it can be gripped by a user's fingers, and a bifurcated trip arm attached to an inner end of the shaft and thereby disposed on the interior side of the front cover. The bifurcated trip arms are disposed at the same angular orientation on the elongated shafts of the operating members.

The bifurcated trip arm of each of the operating members is releasably coupled directly with one of the circuit breaker switches. By rotating the handle of an operating member in one direction, the respective one switch is moved linearly and arcuately from an "on" position to "off" position, whereas by rotating the handle of the operating member in the opposite direction the one switch is moved linearly and arcuately in reverse from the "off" position to the "on" position. The handles of the operating members in one column must be rotated in a direction opposite to the direction in which the handles of the operating members in the other column must be rotated in order for all circuit breaker switches of both columns of modules to move either to their respective "on" positions or to their respective "off" positions. To protect the operating members from unauthorized movement, latches are typically mounted to the front cover for use in locking the handles of the operating members at the desired one of their "on" or "off" positions.

There are several major drawbacks with a panelboard having the above-described construction. One drawback is that due to the closeness of adjacent operating members in each of the columns thereof, it is difficult to easily and quickly grip a desired one of the handles in order to move a selected one of the circuit breaker switches between its "on" and "off" positions.

Another drawback is that due to the closeness of the holes in the front cover which mount the operating members, stresses that are normally induced in the portions of the front cover surrounding the mounting holes tend to concentrate at these front cover portions and initiate cracks which can propagate and cause premature fractures of the front cover between the holes. Such fractures can interfere with properly functioning of the operating members and integrity of the cover and so typically necessitate replacement of the front cover and operating members of the panelboard.

Consequently, a need exists to provide an improvement of the construction of the above-described prior art circuit breaker panelboard which will eliminate the above-described drawbacks of the prior art without introducing new ones in their place.

SUMMARY OF THE INVENTION

The present invention provides an improved circuit breaker switch actuating assembly in a circuit breaker panelboard being designed to satisfy the aforementioned needs. The switch actuating assembly of the present invention substantially reduces concentration of stresses by increasing the spacing between the mounting holes in the front cover of the panelboard. The operating members and the stresses induced in the front cover by pressures applied to the front cover when there is an explosion within the panelboard are distributed or spread over a larger area of the front cover. This not only reduces stress concentrations but also increases accessibility to a desired one of the operating member handles. The reduction in stress concentrations will increase the useful life of the front cover of the panelboard.

Accordingly, the present invention is directed to a circuit breaker switch actuating assembly in a circuit breaker panelboard. The circuit breaker panelboard has a housing for mounting a plurality of circuit breaker actuators arranged in a pair of spaced columns and movable between "on" and "off" positions and a cover releasably attachable to the housing for enclosing the circuit breaker actuators. The circuit breaker switch actuating assembly comprises: (a) a plurality of operating members rotatably mounted to the cover and arranged in first and second groups; and (b) a plurality of linking members disposed between the cover and housing and arranged in first and second groups.

The operating members of the first group thereof are disposed in a first pair of columns aligned with the pair of columns of the circuit breaker actuators and provided in directly coupled relationships with first alternating ones of the circuit breaker actuators in the columns such that selected rotation of the operating members of the first group causes selected movement of the first alternating ones of the circuit breaker actuators. The operating members of the second group thereof are disposed in a second pair of columns respectively displaced laterally outwardly from opposite sides of the pair of columns of the circuit breaker actuators such that the operating members of the second group thereof are spaced from second alternating ones of the circuit breaker actuators in the columns. The linking members of the first and second groups thereof respectively extend between and interconnect the operating members of the second group thereof and the second alternating ones of the circuit breaker actuators in the respective columns so as to provide indirectly coupled relationships therebetween such that selected rotation of the operating members of the second group thereof cause selected movement of the second alternating ones of the circuit breaker actuators.

More particularly, the operating members are equal in number to the number of circuit breaker actuators mounted to the housing and each operating member corresponds to one of the circuit breaker actuators so that a particular one of the operating members can be selected and rotated to actuate a desired one of the circuit breaker actuators. The linking members are equal in number to one-half of the number of circuit breaker actuators mounted to the housing.

Further, each operating member includes an elongated shaft rotatably mounted through the cover, a handle attached to an outer end of the shaft and disposed on an exterior side of the cover where it can be gripped by a user's fingers, and a trip arm attached to an inner end of the shaft and disposed on an interior side of the cover. The trip arm has a bifurcated configuration. On the one hand, the bifurcated trip arms of the operating members of the first group thereof directly interfit respectively with first alternating ones of the circuit breaker actuators such that rotation of the operating members and their trip arms causes linear movement of the first alternating ones of the circuit breaker actuators between the "on" and "off" positions. On the other hand, the bifurcated trip arms of the operating members of the second group thereof interfit with ends of the linking members such that rotation of the operating members and their trip arms causes linear movement of the linking members and of second alternating ones of the circuit breaker actuators therewith between the "on" and "off" positions.

Also, the trip arms of the operating members of the first group thereof are disposed at angular orientations being opposite to the angular orientations of the trip arms of the operating members of the second group thereof. Further, the linking members of the first group thereof are disposed at an orientation being opposite to an orientation of the linking members of the second group thereof. These orientations result in all of the handles of the operating members having the same "on" and "off" positions.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
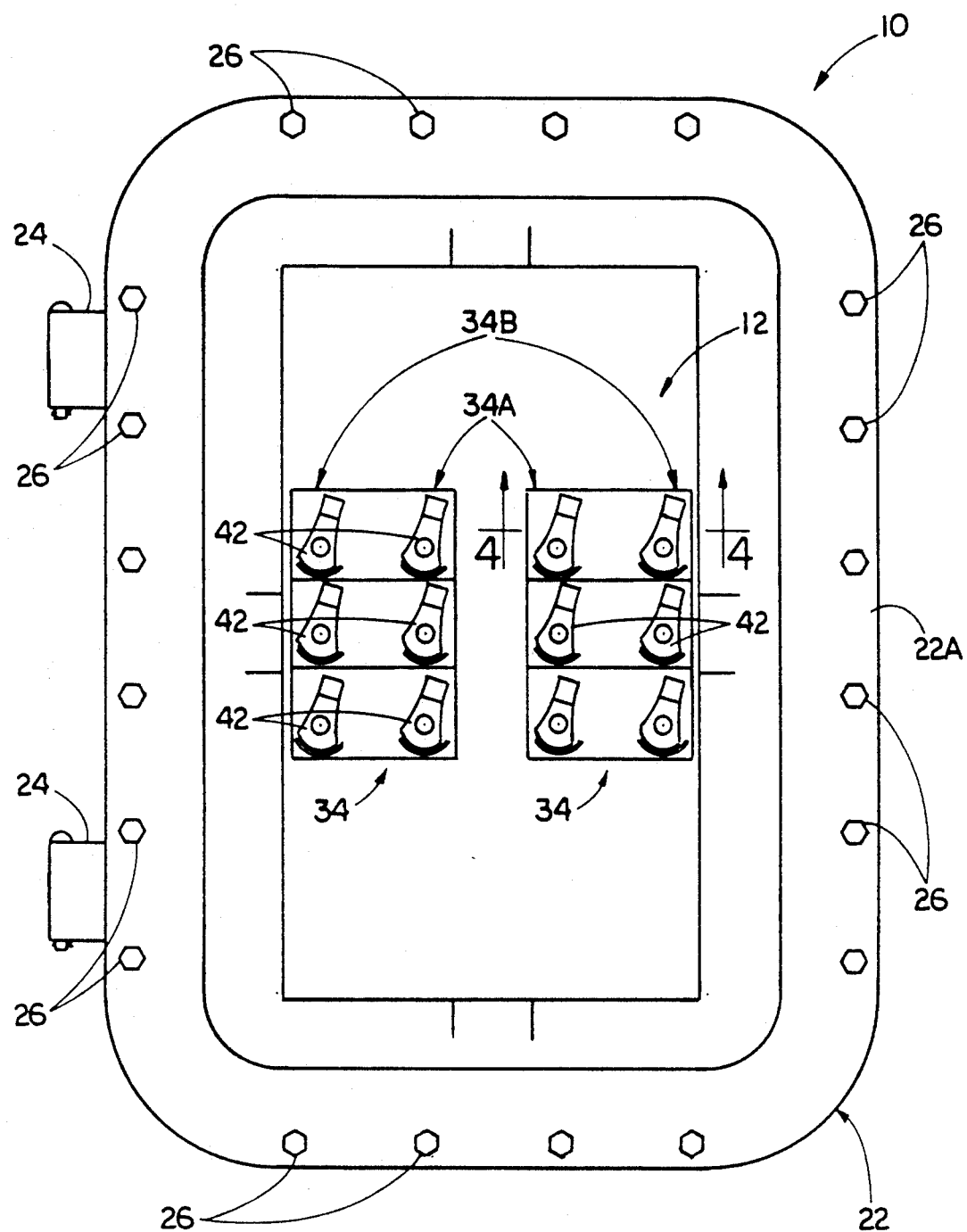
FIG. 1 is a front elevational view of a circuit breaker panelboard incorporating an improved circuit breaker switch actuating assembly of the present invention, showing those of the components of the assembly disposed on the exterior side of a front cover of the panelboard.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 2:
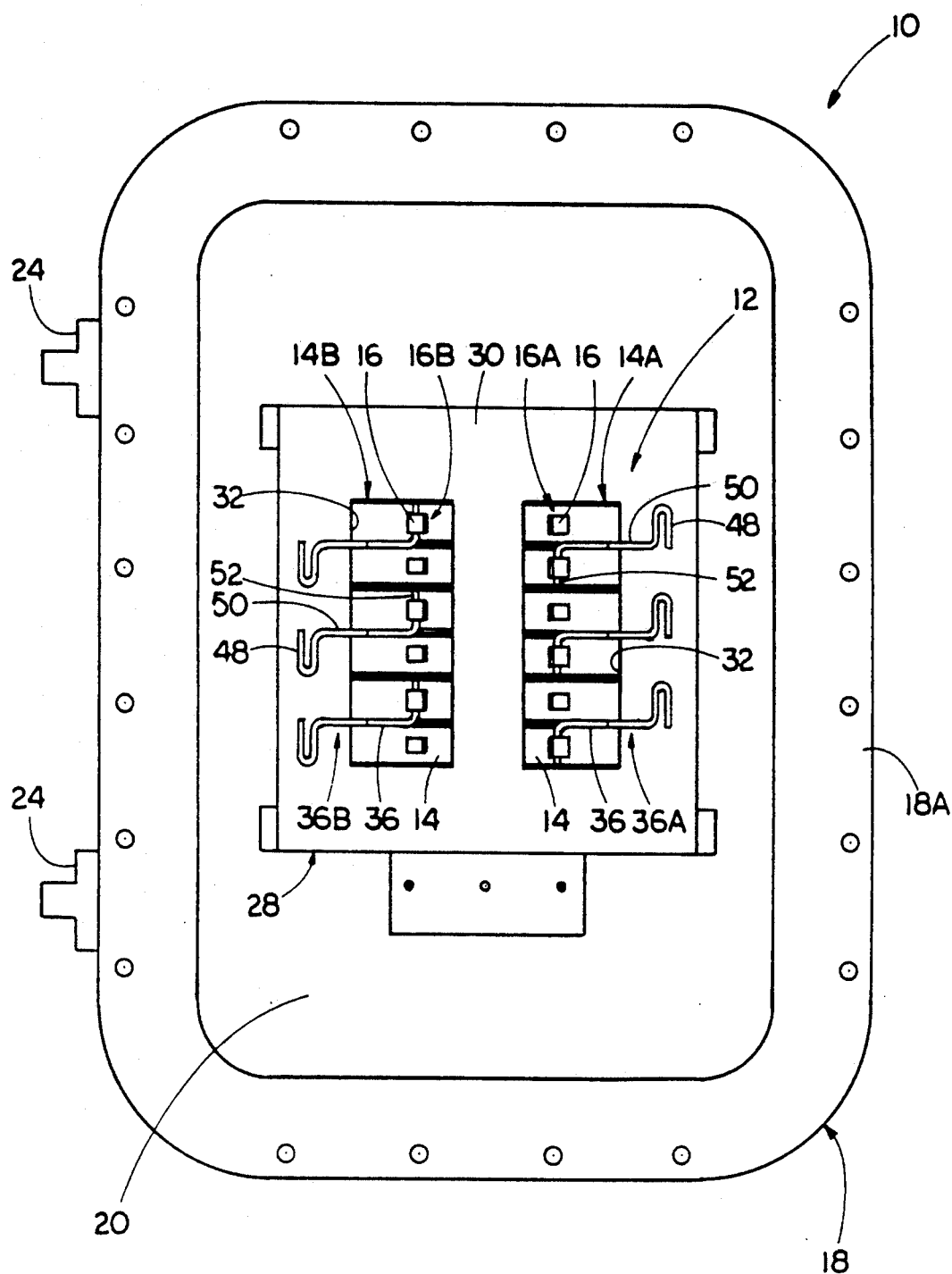
FIG. 2 is a front elevational view of the circuit breaker panelboard incorporating the improved circuit breaker switch actuating assembly of the present invention, showing those of the components of the actuating assembly disposed on the interior side of a rear housing of the panelboard.
Figure 3:
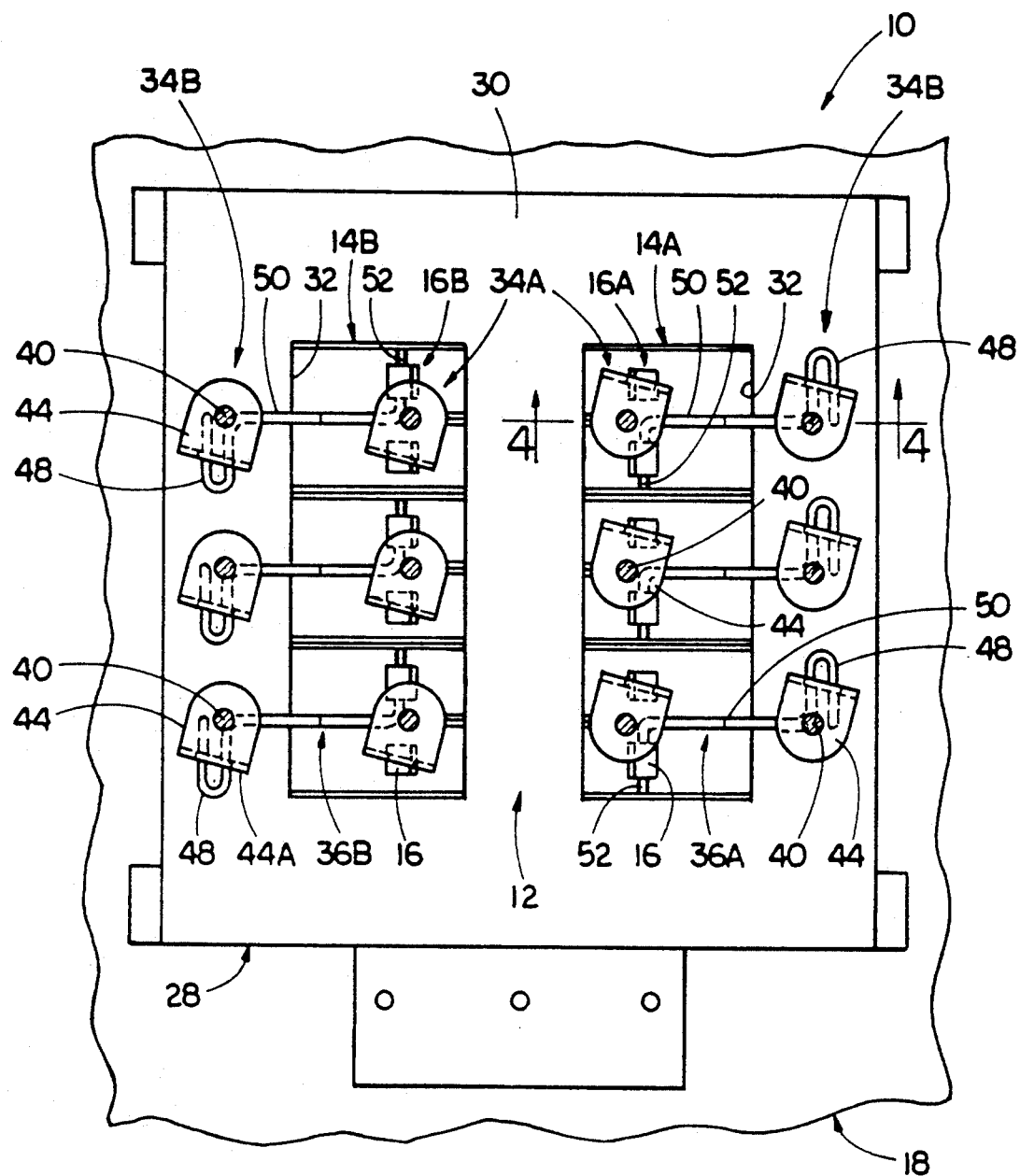
FIG. 3 is an enlarged fragmentary view of a central region of rear housing of the panelboard of FIG. 2, showing those of the components of the actuating assembly disposed on the respective interior sides of the front cover and rear housing of the panelboard in coupled relationship with each other and with the circuit break actuators.

Referring now to the drawings, and particularly to FIGS. 1-3, there is illustrated a circuit breaker panelboard, generally designated 10, incorporating an improved circuit breaker switch actuating assembly, generally designated 12, in accordance with the present invention. The circuit breaker panelboard 10 encloses a plurality of circuit breaker modules 14 arranged at a circuit breaker installation in a pair of parallel vertical columns 14A, 14B, as seen in FIGS. 2 and 3. The modules 14 have actuators 16 also arranged in the pair of generally parallel spaced apart vertical columns 16A, 16B. The "on" and "off" positions of the actuators 16A in one column of modules 14A are opposite to the "on" and "off" positions of the actuators 16B in the other column of modules 14B.

The circuit breaker panelboard 10 includes a rear housing 18 defining a recessed cavity 20, and a front cover 22 mounted by hinges 24 to the rear housing 18 for pivotal movement relative thereto for opening and closing access to the cavity 20 of the rear housing 18. The rear housing 18 and front cover 22 are preferably releasably attachable together at their respective peripheral rims 18A, 22A by a plurality of bolts 26. Sealing gaskets (not shown) can be provided between the peripheral rims 18A, 22A to seal the cavity 20 from the exterior environment.

The circuit breaker panelboard 10 also includes a mounting bracket 28 for supporting the circuit breaker modules 14. The mounting bracket 28 is disposed in the cavity 20 and attached to the rear housing 18. A front panel 30 of the mounting bracket 28 defines a pair of elongated windows 32 in side-by-side spaced relation to one another. The circuit breaker modules 14 are mounted to the bracket 28 such that they are arranged in the pair of parallel columns 14A, 14B and exposed through the windows 32 thereof. The circuit breaker actuators 16 of the columns of modules 14A, 14B are thereby correspondingly arranged in the pair of parallel columns 16A, 16B.

Improved Switch Actuating Assembly of the Invention

Referring to FIGS. 1-4, the circuit breaker panelboard 10 thus includes the rear housing 18 mounting the circuit breaker actuators 16 arranged in the pair of spaced vertical columns 16A, 16B and the front cover 22 releasably attachable to the rear housing 18 for enclosing the circuit breaker actuators 16. The improved circuit breaker switch actuating assembly 12 is coupled to the circuit breaker actuators 16 and to the front cover 22 for facilitating manipulation of the actuators 16 from the exterior of the front cover 22.

Referring to FIGS. 1-10, the improved switch actuating assembly 12 of the present invention incorporated by the above-described circuit breaker panelboard 10 basically includes a plurality of operating members 34 mounted to the front cover 22 and arranged in first and second groups 34A, 34B thereof and a plurality of linking members 36 disposed between the front cover 22 and the rear housing 18 and arranged in first and second groups 36A, 36B thereof. The operating members 34 are in equal number to the number of the circuit breaker actuators 16 mounted to the rear housing 18 and each operating member 34 corresponds to one of the circuit breaker actuators 16 so that a particular one of the operating members 34 can be selected and rotated to actuate a desired one of the circuit breaker actuators 16.

The operating members 34A of the first group are disposed in a first pair of vertical columns aligned with the pair of vertical columns 16A, 16B of the circuit breaker actuators 16. The operating members 34A are also provided in directly coupled relationships with first alternating ones of the circuit breaker actuators 16A, 16B in the pair of vertical columns. The operating members 34B of the second group are disposed in a second pair of vertical columns respectively displaced laterally outwardly from the pair or vertical columns 16A, 16B of the circuit breaker actuators 16. Thus, the operating members 34B are spaced from the second alternating ones of the circuit breaker actuators 16A, 16B in the pair of columns. The linking members 36A, 36B of the first and second groups extend between and interconnect the second alternating ones of the circuit breaker actuators 16A, 16B in both vertical columns and respective operating members 34B of the second group being disposed in the second pair of vertical columns. Thus, the linking members 36A, 36B provide indirect coupled relationships between the operating members 34B and the second, alternating ones of the circuit breaker actuators 16A, 16B.

The above-described arrangement of the operating members 34 permits the provision of a plurality of spaced holes 38A, 38B arranged in first and second pairs of vertical columns in the front cover 22 of the panelboard 10 which correspond to the first and second pairs of vertical columns of the operating members 34A, 34B for rotatably mounting the operating members 34 to the front cover 22. The holes 38 are thus arranged differently and farther apart from one another in the front cover 22 herein than they are in the prior art construction described in the background section of the application. As seen in FIG. 3, only the holes 38A in the first pair of vertical columns are disposed in general alignment with the actuators 16 of the circuit breaker modules 14. The increased spacing between the holes 38 increases the distribution of stresses generated in the front cover 22 and reduces the inducement of crack generation therein.

Figure 4:
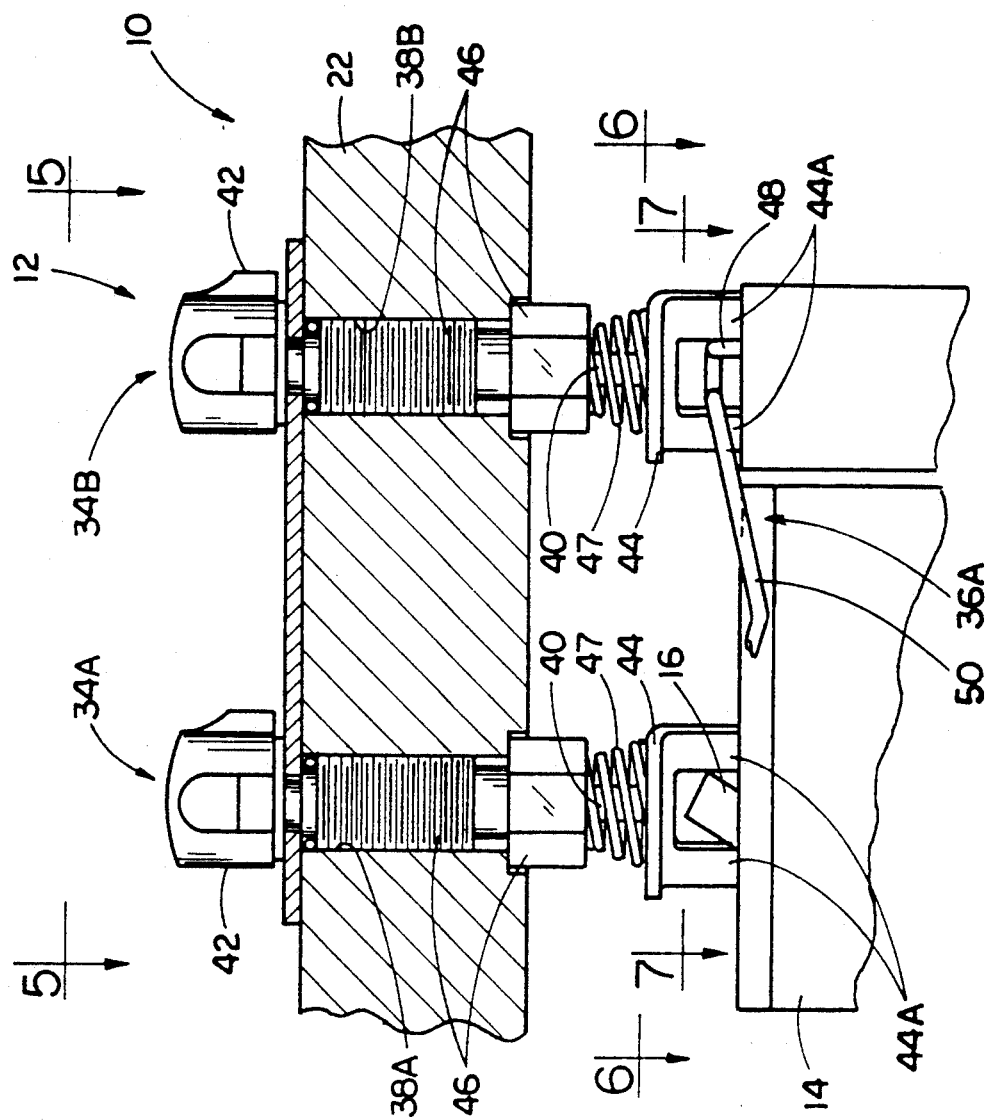
FIG. 4 is an enlarged fragmentary view taken along lines 4—4 of FIGS. 1 and 3 through the front cover of the panelboard, showing in side elevation the components comprising the actuating assembly disposed both on the exterior and interior side of the front cover and on the interior side of the rear housing of the panelboard in coupled relate with each other and with the circuit breaker actuators.
Figure 5:
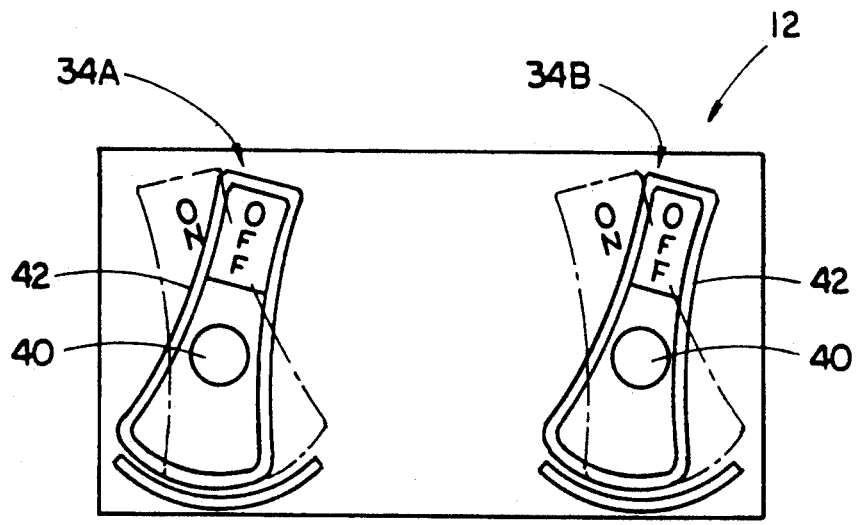
FIG. 5 is a top plan view of the switch actuating ass seen along line 5—5 of FIG. 4, showing handles of operating members of the actuating assembly, and thereby the circuit breaker actuators coupled thereto, disposed at "off" positions.
Figure 6:
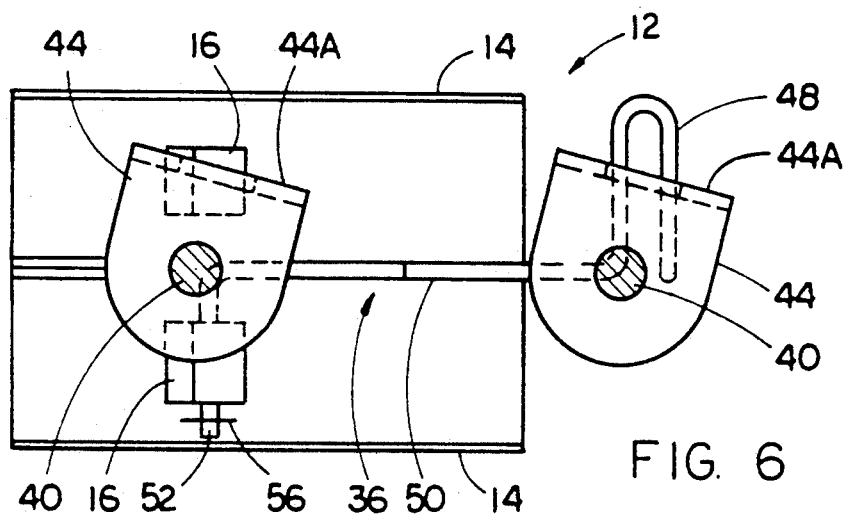
FIG. 6 is a transverse sectional view of the switch actuate assembly taken along line 6—6 of FIG. 4, showing the bifurcated trip arms of operating members and a linking member of the actuating assembly disposed at "off" positions.
Figure 7:
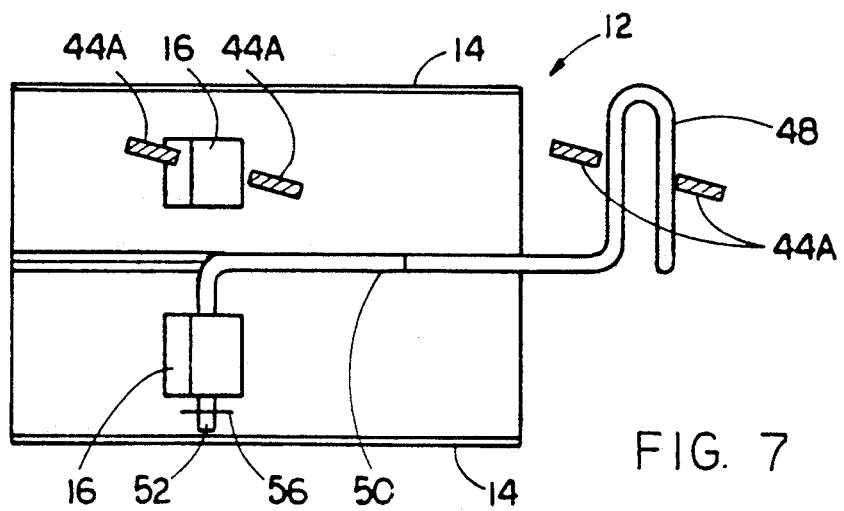
FIG. 7 is another transverse sectional view of the switch actuating assembly taken along line 7—7 of FIG. 4, showing the bifurcated trip arms of the operating members and the linking member of the actuating assembly at "off" positions.
Figure 8:
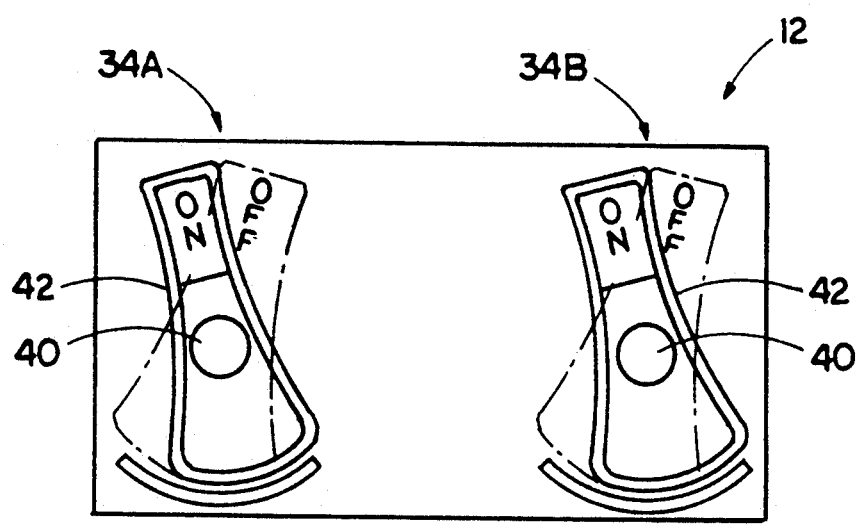
FIG. 8 is a top plan view of the switch actuating assembly to that of FIG. 5, but showing handles of operating members of the actuating assembly, and thereby the circuit breaker actuators coupled thereto, disposed at "on" positions.
Figure 9:
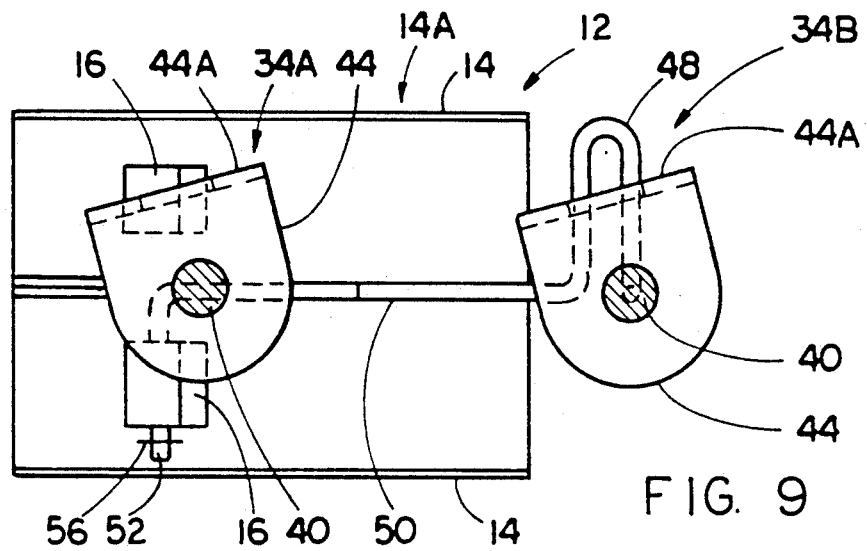
FIG. 9 is a transverse sectional view of the switch actuate assembly similar to that of FIG. 6, but showing the bifurcated trip arms of operating members and the linking member of the actuating assembly disposed at "on" positions.
Figure 10:
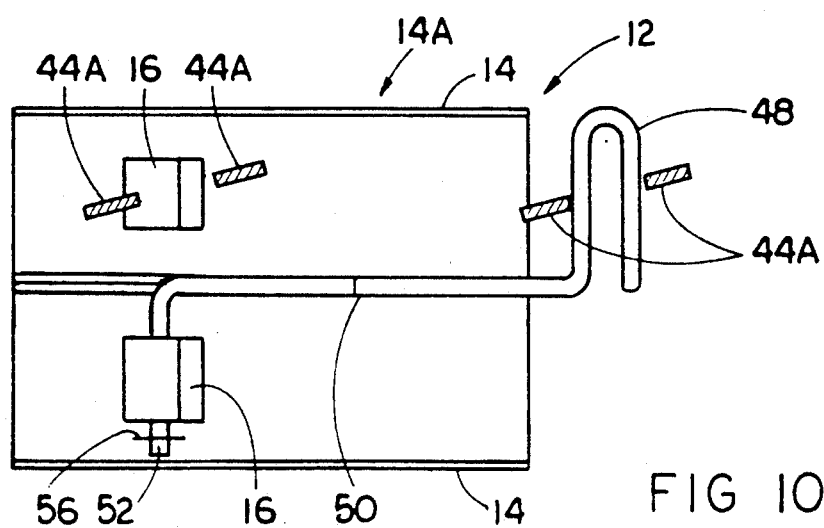
FIG. 10 is another transverse sectional view of the switch actuating assembly similar to that of FIG. 7, but showing the bifurcated trip arms of operating members and the linking member of the actuating assembly disposed at "on" positions.
Figure 12:
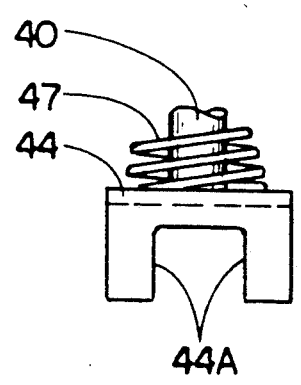
FIG. 12 is a fragmentary front elevational view of the operating member of the switch actuating assembly as seen along line 12—12 of FIG. 11.
Figure 11:
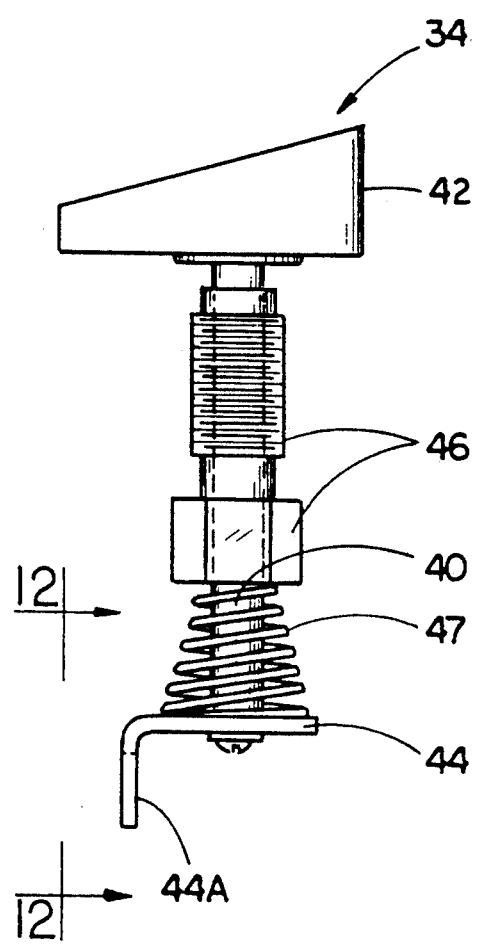
FIG. 11 is a side elevational view of one of the operating members of the switch actuating assembly of FIG. 4 by itself.
Figure 13:
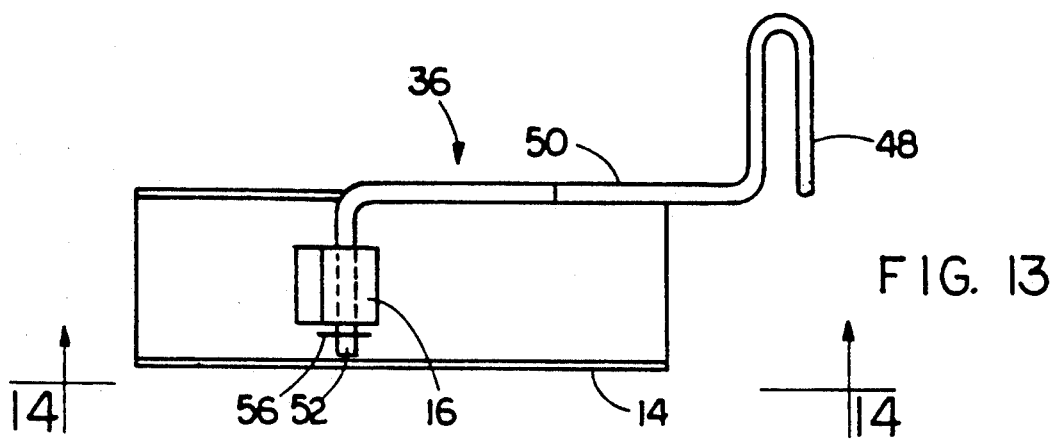
FIG. 13 is a top plan view similar to that of FIG. 7, showing one of the plurality of linking members employed in the switch actuating assembly in conjunction with one of the switch modules.
Figure 14:
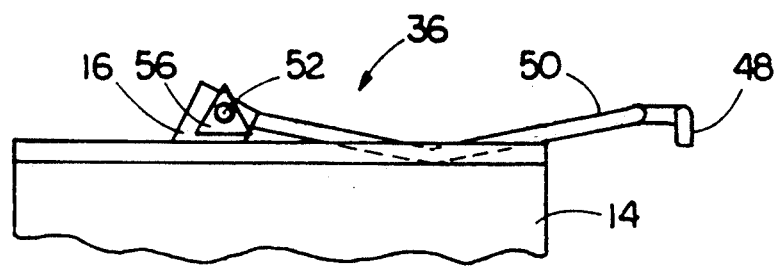
FIG. 14 is a side elevational view of the linking member and switch module as seen along line 14—14 of FIG. 13.
Figure 15:
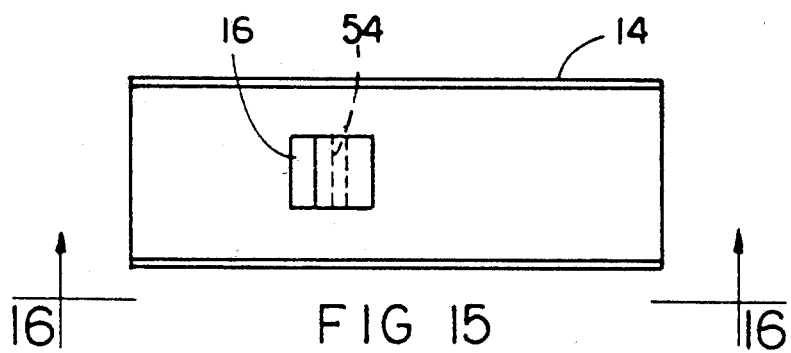
FIG. 15 is a top plan view similar to that of FIG. 13, showing one of the plurality of switch modules.
Figure 16:
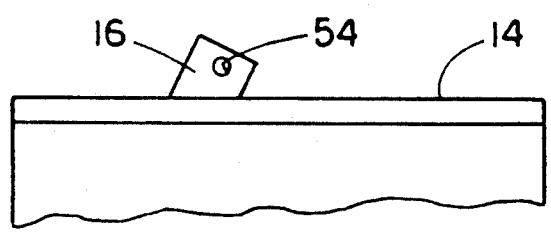
FIG. 16 is a side elevational view of the one switch module as seen along line 16—16 of FIG. 15.

Referring to FIGS. 4, 11 and 12, each operating member 34 includes an elongated shaft 40, a lever or handle 42 attached to an outer end of the shaft 40, and a trip arm 44 attached to an inner end of the shaft 40. The shaft 40 is rotatably and slidably mounted to the front cover 22 by a bushing 46 which is threaded through a respective one of the holes 38 in the front cover 22. The handle 42 is disposed on the exterior side of the front cover 22 where it can be easily gripped by a user's fingers. The trip arm 44 is disposed on the interior side of the front cover 22. A compressed coiled spring 47 is disposed between an end surface of the bushing 46 and a top surface of the trip arm 44 so as to urge the trip arm 44 and shaft 40 toward the surface of the respective module 14 or of the bracket 28 adjacent thereto to ensure coupling between the trip arm 44 and the respective actuator 16 or linking member 36. The terminal end 44A of each of the trip arms 44 has a bifurcated configuration.

Referring to FIGS. 5–10, the bifurcated ends 44A of the trip arms 44 on the operating members 34A of the first group thereof interfit respectively with the first alternating ones of the circuit breaker actuators 16 in both columns such that rotation of the operating members 34A and thereby of the trip arms 44 thereof causes linear movement of the first alternating ones of the circuit breaker actuators between the "on" and "off" positions. On the other hand, the bifurcated ends 44A of the trip arms 44 of the operating members 34B of the second group thereof interfit with looped end portions 48 of the linking members 36A, 36B of the first and second groups thereof such that rotation of the operating members 34B and thereby of the trip arms 44 thereof causes linear movement of the linking members 36A, 36B and thereby of the second alternating ones of the circuit breaker actuators 16 between the "on" and "off" positions. Due to the alternating arrangement of the linking members 36 and the operating members 34A of the first group thereof, the opposite orientations of the linking members 36A, 36B, and the placement of the trip arms 44 of the operating members 34A of the first group thereof at angular orientations being opposite, or displaced 180°, to the angular orientations of trip arms 44 of the operating members 34B of the second group thereof, all of the handles 42 have identical "on" and "off" positions even though the "on" and "off" positions of the actuators 16A remain opposite to those of actuators 16B.

Referring to FIGS. 6, 7, 9, 10 and 13–16, it can be seen that each of the linking members 36 has an elongated linear main portion 50 with the looped portion 48 at one end and an axle portion 52 at the opposite end. Both the looped and axle portions 48, 52 extend in transverse relation to the main portion 50. The axle end portion 52 of each linking member 36 extends through a transverse hole 54 formed in each actuator 16 so as to pivotally connect the linking member 36 to the actuator 16 so that the actuator 16 can move through an arcuate and linear path between "on" and "off" positions in response to linear movement of the linking member 36. Preferably, a triangular shaped spring clip 56 is disposed on the axle end portion 52 of the linking member 36 to retain the axle portion 52 inserted through the hole 54 of the switch 16.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. In a circuit breaker panelboard having a housing for mounting a plurality of circuit breaker modules with each module having an actuator movable between "on" and "off" positions, the modules and actuators each being arranged in a pair of spaced columns, and a cover releasably attachable to said housing for enclosing the circuit breaker modules, a circuit breaker actuating assembly, comprising:

(a) a plurality of operating members rotatably mounted to said cover and arranged in first and second groups, said operating members of said first group being disposed in a first pair of columns aligned with said pair of columns of said circuit breaker actuators and provided in directly coupled relationships with first alternating ones of said circuit breaker actuators in said columns such that selected rotation of said operating members of said first group causes selected movement of said first alternating ones of said circuit breaker actuators, said operating members of said second group being disposed in a second pair of columns respectively displaced laterally outwardly from opposite sides of said pair of columns of said circuit breaker actuators such that said operating members of said second group are spaced from second alternating ones of said circuit breaker actuators in said columns; and (b) a plurality of linking members disposed between said cover and housing and arranged in first and second groups, said linking members of said first and second groups respectively extending between and interconnecting said operating members of said second group and said second alternating ones of said circuit breaker actuators in said respective columns so as to provide indirectly coupled relationships therebetween such that selected rotation of said operating members of said second group causes selected movement of said linking members and thereby to said second alternating ones of said circuit breaker actuators.

2. The actuating assembly as recited in claim 1, wherein said operating members of said first and second groups are equal in number to the number of circuit breaker modules mounted to said housing.

3. The actuating assembly as recited in claim 1, wherein each of said operating members corresponds to one of said circuit breaker actuators so that a particular one of said operating members can be rotated to actuate a desired one of said circuit breaker actuators.

4. The actuating assembly as recited in claim 1, wherein said linking members are equal in number to one-half of the number of circuit breaker modules mounted to said housing.

5. The actuating assembly as recited in claim 1, wherein each of said operating members includes:
    an elongated shaft rotatably mounted through said cover;
    a handle attached to an outer end of said shaft and disposed on an exterior side of said cover where it can be gripped by a user's fingers; and
    a trip arm attached to an inner end of said shaft and disposed on an interior side of said cover.

6. The actuating assembly as recited in claim 5, wherein said trip arm has a bifurcated configuration.

7. The actuating assembly as recited in claim 6, wherein said bifurcated trip arms of said operating members of said first group thereof interfit respectively with first alternating ones of said circuit breaker actuators such that rotation of said trip arms will cause linear movement of said first alternating ones of said circuit breaker actuators between said "on" and "off" positions.

8. The actuating assembly as recited in claim 6, wherein said bifurcated trip arms of said operating members of said second group thereof interfit with ends of said linking members such that rotation of said trip arms will cause linear movement of said linking members and of said second alternating ones of said circuit breaker actuators therewith between said "on" and "off" positions.

9. The actuating assembly as recited in claim 6, wherein said trip arms on said shafts of said operating members of said first group thereof are disposed at angular orientations being opposite to the angular orientations of said trip arms on said shafts of said operating members of said second group thereof.

10. The actuating assembly as recited in claim 1, wherein said linking members of said first group thereof are disposed at an orientation being opposite to an orientation of said linking members of said second group thereof.

11. In a circuit breaker panelboard having a rear housing for mounting a plurality of circuit breaker modules arranged in a pair of spaced columns and having an actuator associated with each module being movable between "on" and "off" positions, the actuators being arranged such that said "on" and "off" positons in one column are opposite to said "on" and "off" positions in the other column, said panelboard also having a front cover releasably attachable to said rear housing for enclosing the circuit breaker modules and associated actuators, a circuit breaker actuating assembly, comprising:
  (a) a plurality of operating members rotatably mounted to said front cover and arranged in first and second groups, said operating members being the same in number as the number of said circuit breaker modules in said plurality thereof mounted to said rear housing;
  (b) said operating members of said first group thereof being disposed in a first pair of columns aligned with said pair of columns of said circuit breaker actuators and provided in directly coupled relationships with first alternating ones of said circuit breaker actuators in said columns such that selected rotation of said operating members of said first group thereof causes selected movement of said first alternating ones of said circuit breaker modules;
  (c) said operating members of said second group thereof being disposed in a second pair of columns respectively displaced laterally outwardly from opposite sides of said pair of columns of said circuit breaker actuators such that said operating members of said second group are spaced from second alternating ones of said circuit breaker actuators in said columns; and
  (d) a plurality of linking members disposed between said cover and housing and arranged in first and second groups thereof, said linking members of said first and second groups respectively extending between and interconnecting said operating members of said second group and said second alternating ones of said circuit breaker actuators in said respective columns so as to provide indirectly coupled relationships therebetween such that selected rotation of said operating members of said second group causes selected movement of said linking members and thereby of second alternating ones of said circuit breaker actuators.

12. The actuating assembly as recited in claim 11, wherein each of said operating members corresponds to one of said circuit breaker actuators so that a particular one of said operating members can be rotated to actuate a desired one of said circuit breaker actuators.

13. The actuating assembly as recited in claim 11, wherein said linking members are equal in number to one-half of the number of circuit breaker actuators mounted to said rear housing.

14. The actuating assembly as recited in claim 11, wherein each of said operating members includes:
  an elongated shaft rotatably mounted through said front cover;
  a handle attached to an outer end of said shaft and disposed on an exterior side of said front cover where it can be gripped by a user's fingers; and
  a trip arm attached to an inner end of said shaft and disposed on an interior side of said front cover.

15. The actuating assembly as recited in claim 14, wherein said trip arm has a bifurcated configuration.

16. The actuating assembly as recited in claim 15, wherein said bifurcated trip arms of said operating members of said first group thereof interfits with first alternating ones of said circuit breaker actuators such that rotation of said trip arm will cause linear movement of said first alternating ones of said circuit breaker switches between "on" and "off" positions.

17. The actuating assembly as recited in claim 16, wherein said bifurcated trip arms of said operating members of said second group thereof interfits with ends of said linking members such that rotation of said trip arm will cause linear movement of said linking members and of said second alternating ones of said circuit breaker switches therewith between "on" and "off" positions.

18. The actuating assembly as recited in claim 17, wherein said trip arms on said shafts of said operating members of said first group thereof are disposed at angular orientations being opposite to angular orientations of said trip arms on said shafts of said operating members of said second group thereof.

19. The actuating assembly as recited in claim 18, wherein said linking members of said first group thereof are disposed at orientations being opposite to orientations of said linking members of said second group thereof such that rotation of said operating members in the same direction causes movement of said circuit breaker actuators for the same one of said "on" and "off" positions to the other of said positions.

* * * * *